United States Patent [19]
Anderson et al.

[11] Patent Number: 6,067,142
[45] Date of Patent: May 23, 2000

[54] VERTICALLY ALIGNED PI-CELL LCD HAVING ON-STATE WITH MID-PLANE MOLECULES PERPENDICULAR TO THE SUBSTRATES

[75] Inventors: James E. Anderson, Kent, Ohio; Chen Cai, White Plains; Shui-Chih Alan Lien, Briarcliff Manor, both of N.Y.

[73] Assignee: International Business Machines Corporation, Armonk, N.Y.

[21] Appl. No.: 09/238,264

[22] Filed: Jan. 27, 1999

[51] Int. Cl.[7] .................................................. G02F 1/1337
[52] U.S. Cl. ............................................. 349/130; 349/123
[58] Field of Search ..................................... 349/130, 131, 349/123

[56] References Cited

U.S. PATENT DOCUMENTS

| | | | |
|---|---|---|---|
| 4,492,432 | 1/1985 | Kaufmann et al. | 349/130 |
| 5,477,358 | 12/1995 | Rosenblatt et al. | 349/130 |
| 5,701,168 | 12/1997 | Patel | 349/130 |
| 5,710,609 | 1/1998 | Shimada | 349/130 |

OTHER PUBLICATIONS

Vithana et al., "Controlled Tilted Homeotropic Alignment of Liquid Crystals for Display Applications," Jpn. J. Appl. Phys., vol. 35 (1996), pp. L320–L323.

J.F. Clerc, "Vertically Aligned Liquid–Crystal Displays," SID Digest, pp. 758–761, 1991.

Flynn et al., "Contrast and Color Uniformity Optimization of an LCD Pi Cell Pixel," Mol. Cryst. Liq. Cryst., vol. 263, pp. 377–387, 1995.

P.J. Bos et al., "The Pi–Cell: A Fast Liquid–Crystal Optical–Switching Device," Mol. Cryst. Liq. Cryst., vol. 113, pp. 329–339, 1984.

Fredley et al., "Polymer Stabilized SBE Devices," Conference Record of the 1994 International Display Research Conference and International Workshops on Active Matrix LCDs and Display Materials, pp. 480–483, 1994.

Bos et al., "Polymer Modified TN and STN Devices," SPIE, vol. 2408, pp. 74–81, 1995.

*Primary Examiner*—William L. Sikes
*Assistant Examiner*—Kari M. Horney
*Attorney, Agent, or Firm*—F. Chau & Associates, LLP

[57] ABSTRACT

A liquid crystal mode includes a layer of a liquid crystal material disposed between homeotropic alignment layers having a parallel alignment direction, the liquid crystal material including a negative dielectric anisotropic material. The liquid crystal material having a first state characterized by a vertical alignment of molecules which is substantially perpendicular to the alignment layers, and a second state which is characterized by the orientation of the molecules of the liquid crystal material which is oriented responsive to an electric field such that the molecules above a mid-plane of the liquid crystal material have a tilt in a first direction and the molecules below the mid-plane have a tilt opposite the first direction while the molecules adjacent the alignment layers and at the mid-plane remain substantially perpendicular to the alignment layers. The mid-plane is substantially parallel to the alignment layers.

23 Claims, 5 Drawing Sheets

VERTICALLY ALIGNED PI-CELL LCD HAVING ON-STATE WITH MID-PLANE MOLECULES PERPENDICULAR TO THE SUBSTRATES

BACKGROUND OF THE INVENTION

1. Field of the Invention

The present invention relates to liquid crystal displays and, more particularly, to a vertically aligned pi-cell liquid crystal display with improved characteristics.

2. Description of the Related Art

Many technologies exist for making wide-viewing angle displays. Besides commonly used twisted nematic (TN) liquid crystal display (LCD) modes, there are other LCD modes, such as vertical alignment (VA) mode and pi-cell mode. Referring to FIG. 1A, a conventional VA mode is shown. The VA mode uses homeotropic (vertical) alignment material for alignment layer 10, anti-parallel rubbing with a small pretilt angle (liquid crystal molecules are tilted with a small angle away from the substrate normal direction)for alignment layer 10, negative dielectric anisotropic liquid crystal material 12 and a pair of cross polarizers 11 whose transmission axis makes 45° with respect to the projection of the liquid crystal director onto a substrate 14 surface when the display panel is in the field-on state. A liquid crystal director is a local average of the liquid crystal molecules' direction. Because the homeotropic alignment material and the anti-parallel rubbing are used, in the field off state, the liquid crystal director is almost perpendicular to the substrate surface with a small pretilt angle, say 1° to 10°, away from the substrate 14 normal. (The small pretilt is not shown in FIG. 1A.) This makes the liquid crystal material have virtually no effect on the incident light hitting substrate 14. Therefore, the display panel shows a dark state since cross polarizers 11 are used.

Referring to FIG. 1B, when a voltage is applied between electrodes 18 and 20, the liquid crystal molecules tend to tilt to the horizontal direction as shown, since a negative dielectric anisotropic liquid crystal material is used. Because the polarizers 11 are arranged in a manner such that the transmission axis makes a 45° angle with respect to the projection of the liquid crystal director, in the field-on state, the polarization of light is changed by the liquid crystal medium and light transmits through the display panel. Thus, a bright state is provided.

Referring to FIG. 2A, a conventional pi-cell is shown. The pi-cell mode uses homogenous (planar) alignment material for alignment layer 30, parallel rubbing with a proper pretilt angle (liquid crystal molecules are tilted with a small angle away from the substrate surface) for alignment layer 30, positive dielectric anisotropic liquid crystal material 32 and a pair of cross polarizers 31 whose transmission axis makes 45° with respect to the projection of the liquid crystal director onto a substrate 34 surface when the display panel is in the field-on state. A pi-cell can be operated in a normally black (NB) mode, in which display is a dark state when a low voltage is applied to electrodes 36 and 38, or a normally white (NW) mode, in which display is a bright state when a low voltage is applied. For illustration purposes, a NB is explained below. (The difference between NB mode and NW mode of a pi-cell comes from the difference in birefringence ($d*(n_e-n_o)$) of the panel (where d is thickness of cell gap (between alignment plates), $n_e$ and $n_o$ are the extraordinary and ordinary of the indices of refraction of the liquid crystal material.) Because a homogenous alignment material and a parallel rubbing with a proper pretilt angle are used, in the low-field state, the liquid crystal director is arranged in a bend state as shown in FIG. 2A. The birefringence of the panel is adjusted such that $d*(n_e-n_o)=\lambda$ (where d is thickness of the cell gap, $n_e$ and $n_o$ are the extraordinary and ordinary of the indices of refraction of the liquid crystal material, respectively, $\lambda$ is the wavelength of the incident light in the air). In the low-field state the panel is dark. When a high voltage is applied (high-field state) across electrodes 36 and 38, the liquid crystal director configuration is rearranged so that liquid crystal molecules are more perpendicular to the substrate surface since a positive dielectric anisotropic liquid crystal material is used. Thus, the birefringence of the panel changes and light is transmitted through the panel and a bright state is achieved.

Both the conventional TN and the conventional VA liquid crystal displays suffer from narrow viewing angles. Since the conventional pi-cell is operated in a birefringent mode, the pi-cell does not produce a good dark state.

Therefore, a need exists for a new liquid crystal mode which provides wide viewing angle, fast response speed, high brightness, a good dark state and a high contrast.

SUMMARY OF THE INVENTION

In accordance with the invention, a liquid crystal pixel includes a pair of spaced apart electrodes each having a homeotropic alignment layer provided thereon. The alignment layers face each other and have a same rubbing direction. A liquid crystal material is disposed between the alignment layers, the liquid crystal material including molecules. The electrodes provide an electric field to the liquid crystal material to provide an on state and an off state for the pixel. The off state is characterized by a vertical alignment of the molecules which is substantially perpendicular to the alignment layers. The on state is characterized by the orientation of the molecules of the liquid crystal material which are oriented responsive to the electric field such that the molecules above a mid-plane of the liquid crystal material have a tilt in a first direction and the molecules below the mid-plane have a tilt opposite the first direction while the molecules adjacent the alignment layers remain substantially perpendicular to the alignment layers, the mid-plane being substantially parallel to the alignment layers.

A liquid crystal display includes a pair of transparent substrates having surfaces facing each other, coated with a conductive material, the conductive material forming pixel electrodes for an array of pixels. A pair of homeotropic alignment layers are provided on the conductive material, the alignment layers facing each other and having a same rubbing direction. A liquid crystal material is disposed between the alignment layers, the liquid crystal material including molecules. An electric source provides an electric field to provide an on state and an off state for the pixel electrodes, the off state being characterized by a vertical alignment of the molecules which is substantially perpendicular to the alignment layers. The on state is characterized by the orientation of the molecules of the liquid crystal material which are oriented responsive to the electric field such that the molecules above a mid-plane of the liquid crystal material have a tilt in a first direction and the molecules below the mid-plane have a tilt opposite the first direction while the molecules adjacent the alignment layers remain substantially perpendicular to the alignment layers, the mid-plane being substantially parallel to the alignment layers.

In alternate embodiments, the electrodes may be transparent or reflective. The conductive material for the electrodes may include indium tin oxide. The conductive material for the reflective electrodes may include aluminum. The liquid crystal material may include a negative dielectric anisotropic material, and more specifically, be a fluorinated material. The liquid crystal material may include a layer having a thickness of between about 2 and about 10 microns. The pixel may include polarizers and correction films for providing a viewing angle.

In a particularly useful embodiment, the vertical pi-cell cell mode in accordance with the invention preferably uses homeotropic (vertical) alignment material, parallel rubbing with a proper pretilt angle (liquid crystal molecules are tilted with a small angle away from the substrate normal direction), negative dielectric anisotropic liquid crystal material, and a pair of cross polarizers whose transmission axis makes 45° with respect to the projection of the liquid crystal director onto the substrate surface when the display panel is in the field-on state.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to liquid crystal displays (LCDs) and, more particularly, to a vertically aligned pi-cell liquid crystal display with improved characteristics. The present invention provides a new liquid crystal display (LCD) mode which includes an increased viewing angle, increased speed, increased brightness and reduces dark levels in the dark state thereby improving the contrast ratio of the display.

Figure 1A:
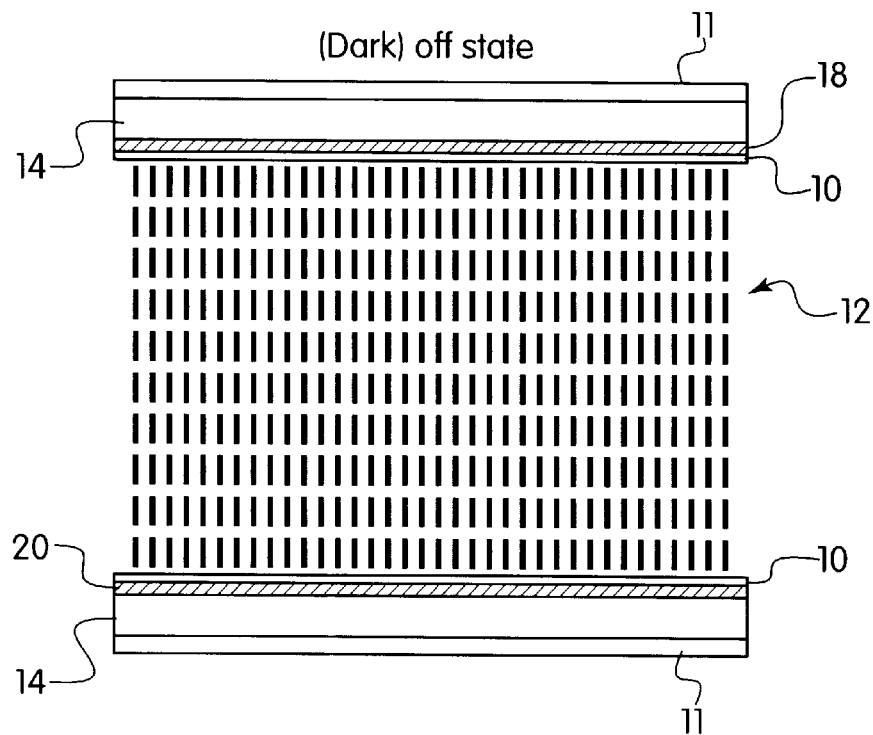
FIGS. 1A–1B are cross-sectional views of vertically aligned pixel cells showing an off state (FIG. 1A) and an on state (FIG. 1B) in accordance with the prior art.
Figure 1B:
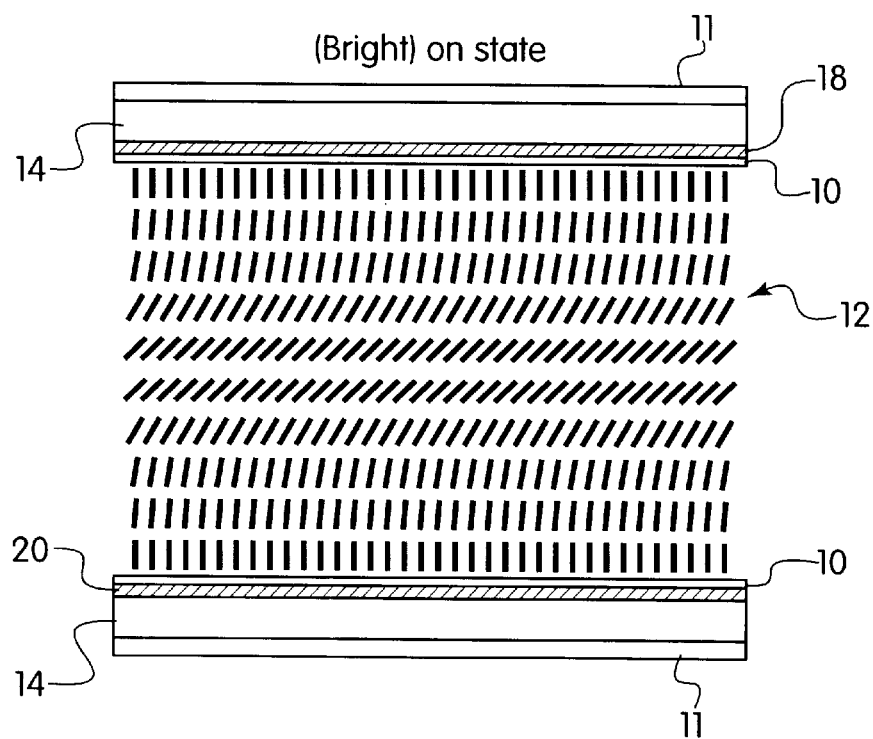
Figure 2A:
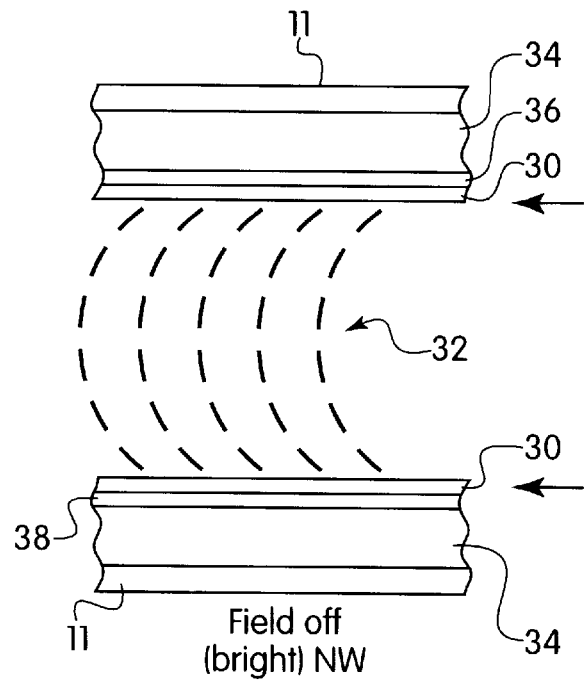
FIGS. 2A–2B are cross-sectional views of pi-cell pixel cells showing an off state (FIG. 2A) and an on state (FIG. 2B) in accordance with the prior art.
Figure 2B:
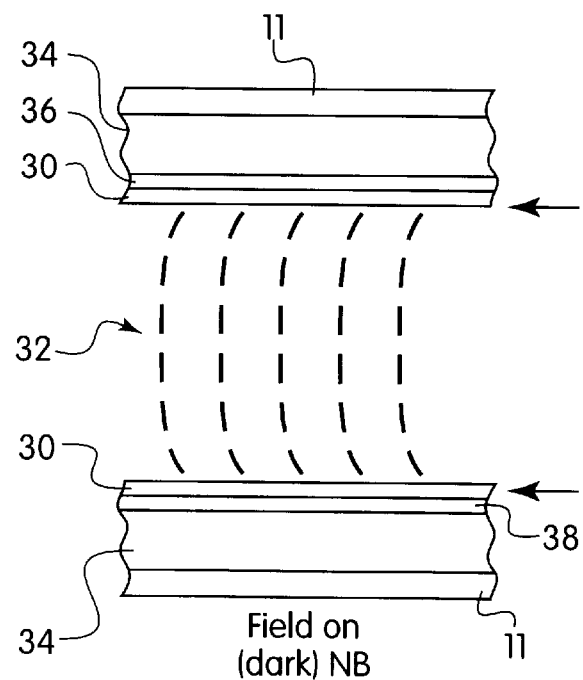
Figure 3:
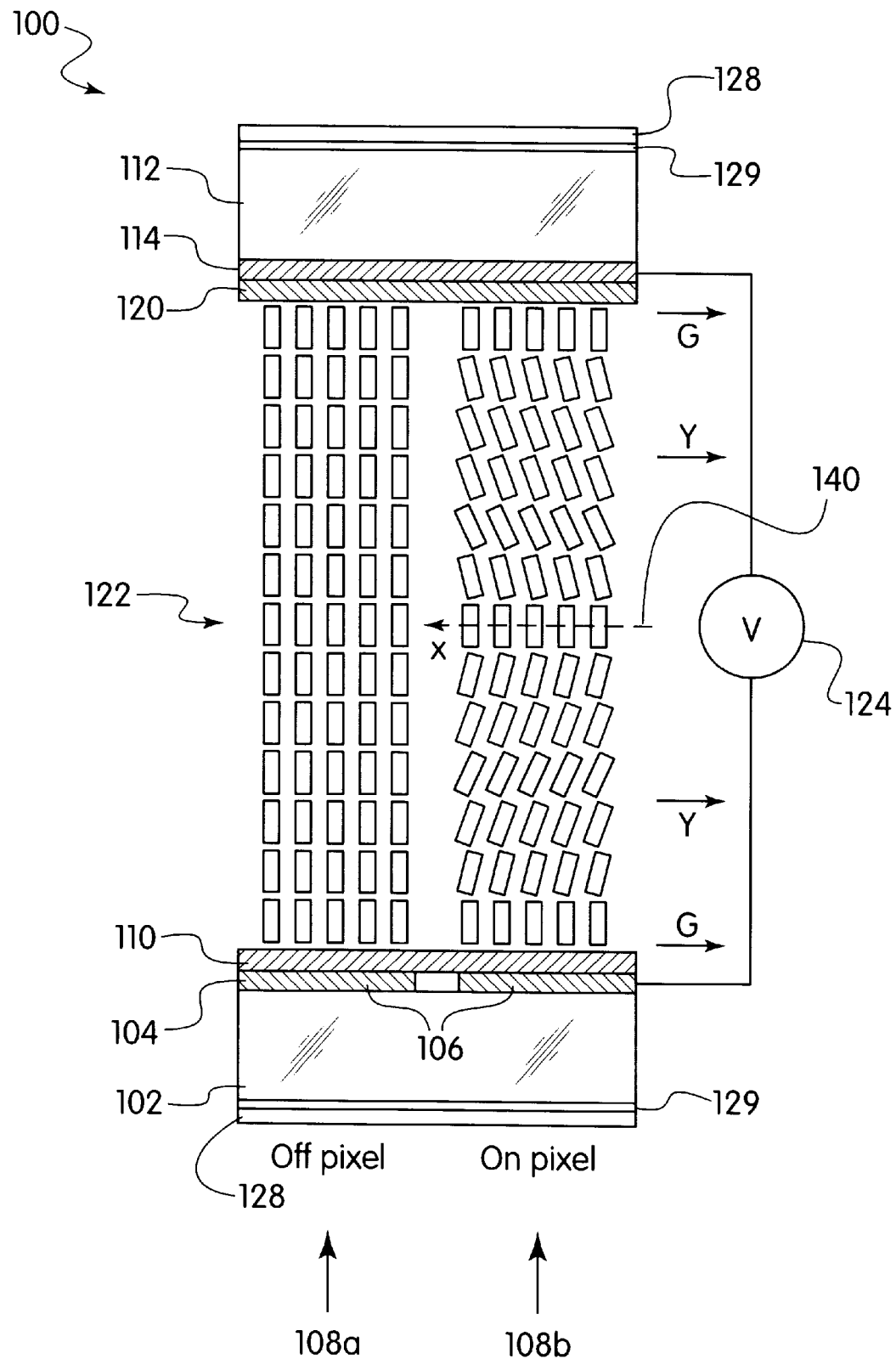
FIG. 3 is a cross-sectional view of two pixels showing an off state and an on state in accordance with the present invention.

Referring now to the drawings in which like numerals represent the same or similar elements and initially to FIG. 3, a cross-sectional view of two LCD pixels are illustratively shown to describe the present invention. An LCD 100 in accordance with the present invention includes a glass substrate 102 or other suitable transparent substrate. LCD 100 may be used in a transmissive or a reflective mode. Substrate 102 is coated with a transparent or reflective conductor layer 104. Conductor layer 104 preferably includes indium tin oxide although other transparent conductive materials may be employed. Conductor layer 104 may also include reflective materials such as aluminum or other reflective materials, if the display is a reflective type. Conductor layer 104 is processed to define pixel electrodes 106 for each individual pixel 108a and 108b to form a pixel array for LCD 100 (See FIG. 6). Pixel control and sequencing circuitry (not shown) is also formed to control activation and deactivation of pixels during use of LCD 100.

An alignment layer 110 is formed on conductor layer 104. Alignment layer 110 is preferably a homeotropic alignment layer. Alignment layer 110 is rubbed in a first direction as indicated by arrow "G". Alignment layer 110, preferably includes SE-1211 available from Nissan Chemical Inc., JALS688 available from JSR Microelectronics, Inc. or other an equivalent materials. Alignment layer 110 is rubbed to give a slight tilt (a few degrees for example) from normal for an optical axis of liquid crystal materials. In this way, alignment layer 110 provides an orientation for liquid crystal materials which are implemented in LCD 100. The liquid crystal materials will be described in greater detail below.

A similar structure to substrate 102, transparent conductive layer 104 and alignment layer 110 is also formed. The structure includes a transparent glass substrate 112 or other suitable transparent substrate. Substrate 112 is coated with a transparent conductor layer to form a transparent electrode 114. Transparent electrode 114 preferably includes indium tin oxide, although other transparent conductive materials may be employed. Transparent electrode 114 is preferably a single electrode spanning over the entire pixel array of LCD 100 and used for all pixel electrodes 106 for each individual pixel (e.g., pixels 108a and 108b).

An alignment layer 120 is formed on transparent conductor layer 114. Alignment layer 120 is preferably a homeotropic alignment layer. Alignment layer 120 is rubbed in the direction as indicated by arrow "G". Alignment layers 110 and 120 are rubbed in the same direction; however, the rubbed direction for both may be opposite the direction of arrow "G" or any other direction provided that the rubbed direction is the same direction for both alignment layers 110 and 120. Alignment layer 120, preferably includes SE-1211 available from Nissan Chemical Inc., JALS688 available from JSR Microelectronics, Inc. or an equivalent material. Alignment layer 120 is also rubbed to give a slight tilt from normal for the optical axis of liquid crystal materials. In this way, alignment layers 110 and 120 provide an orientation for liquid crystal materials as detailed below.

LCD 100 is filled with a liquid crystal material or liquid crystal 122. Liquid crystal material 122 preferably includes a fluorinated material having a negative dielectric anisotropy such as 95-465 or MLC2039 available from Merck Ltd., or an equivalent material. Liquid crystal 122 aligns substantially vertical (substantially perpendicular to surfaces of alignment layer 110 and 120), but with a slight "bend" structure as shown for "off" pixel 108a.

An electric field is provided by a voltage source 124 which creates a potential difference between transparent electrode 114 and pixel electrodes 106. The potential difference is preferably between about 2 and about 8 volts. Voltage source 124 is coupled across transparent electrode 114 and pixel electrodes 106 and controlled to turn individual pixels 106 on and off. In a preferred embodiment of the present invention, when an electric field is applied, molecules in the upper half of liquid crystal material 122 tilt in one direction, and those in the lower half tilt in the opposite direction as shown for pixel 108a in FIG. 3. The liquid crystal molecules adjacent or close to alignment layers 110 and 120 are advantageously aligned in a substantially vertical position in both the on and off states. This aspect of the present invention provides high contrast and the viewing angle advantages of the present invention.

The present invention provides a "self compensating" structure along with the substantially vertical liquid crystal director adjacent to alignment layers 110 and 120 in field on and off configurations. The "self-compensating" structure provides an upper half of the liquid crystal material which compensates a lower half of the liquid crystal material optically for any applied voltage. Liquid crystal 122 molecules, with the configuration shown for pixel 108b, are capable of providing a wide-viewing angle display when properly compensated, for example, by using two biaxial retarders 128 (cross polarizers) and compensation films 129. The calculated viewing angle characteristics when so compensated are illustratively shown in FIG. 4. Note in a reflective display mode the biaxial retarder 128 and compensation film 129 are not needed on the reflective conductor's side since the reflective conductor functions as a mirror to reflect back light.

Figure 4:
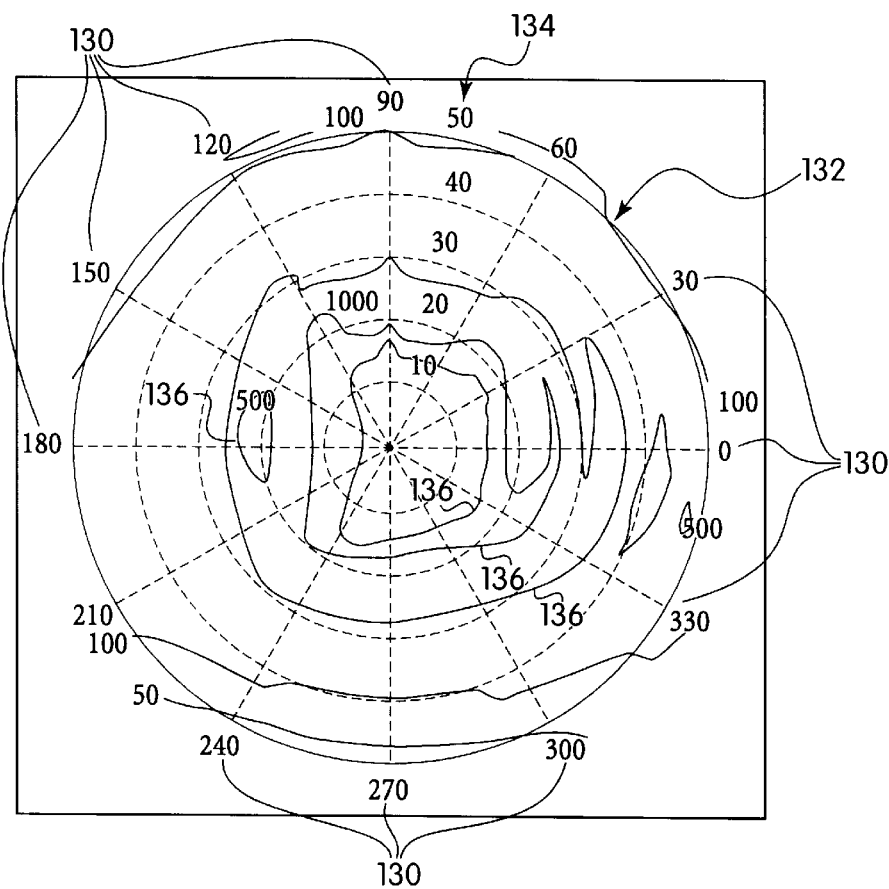
FIG. 4 is an illustrative plot of iso-contrast lines to show wide angle viewing in accordance with the present invention.

Referring to FIG. 4, viewing angle characteristics are shown for the vertically aligned pi-cell 100 of FIG. 3 in accordance with the invention. Angles 130 about the perimeter of a circle 132 represent the 360 degrees of the circle. Angles 134 represent viewing angles as measured relative to a normal to the plane of the page. Lines 136 represent lines of equal contrast value or iso-contrast lines. Iso-contrast lines having a contrast ratio of 100 are shown to have a viewing angle of about 40 degrees. With further compensation and refinements a viewing angle of about 50 degrees is achieved with a contrast ratio of 100 with the present invention.

Referring again to FIG. 3, when the display is switched on, light directors (liquid crystal 122 molecules) on either side of a mid-plane 140 rotate in a complementary way, including a lateral flow in the center (arrow "X") and a compensating flow (arrows "Y") between the center and each alignment layer, thus providing fast switching between on and off states of pixels 108a and 108b (See FIG. 5) for several reasons including less liquid crystal material is displaced. The stability of the voltage applied state may not be stable over hundreds of milliseconds. However, a "reset" pulse may be used for every frame to regenerate molecule orientations of liquid crystal material 122 and break up the applied voltage time frame into tens of milliseconds to provide stability.

Figure 5:
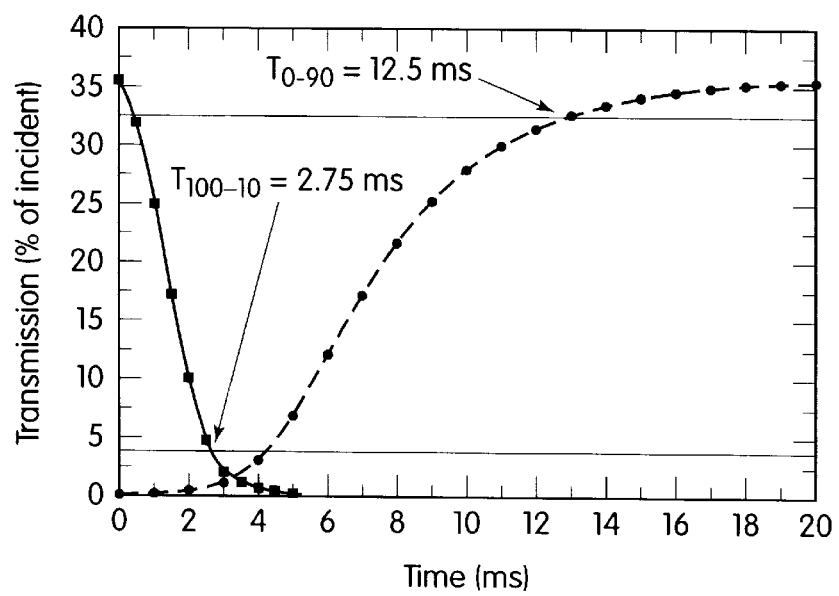
FIG. 5 is an illustrative plot of switching characteristics in accordance with the present invention.

Referring to FIG. 5, a calculated response of the vertically aligned pi-cell LCD in accordance with the present invention is illustratively shown. A calculated on-axis brightness for the vertically aligned pi-cell LCD 100 is about 36% of the incident light when using the above mentioned liquid crystal materials or equivalents, for this example. Advantageously, in accordance with the present invention, a liquid crystal layer thickness (between alignment plates) may be greater than the thicknesses used for conventional displays. To obtain the data for FIG. 5, a liquid crystal layer of about 6 $\mu$m was used. Advantageously, the present invention may use thicknesses between 2 and 10 microns or greater. This increased thickness over a conventional LCD allows for less stringent manufacturing tolerances. Also, no complicated alignment patterns, which add many process steps, are necessary as in other wide viewing angle technologies.

As shown in FIG. 5, transmission of incident light is plotted against time to illustratively demonstrate switching characteristics of a pixel in accordance with the present invention. A fully "on" pixel, for this example, is one which achieves a calculated on-axis brightness of about 36%. 36% is an example of a transmission intensity. The present invention may provide transmissions of about 40% or higher. To turn a pixel on and go from 0% to 90% transmission (of the 36% brightness) takes 12.75 ms ($T_{0-90}$). Likewise, to turn a pixel off and go from 100% to 10% transmission (of the 36% brightness) takes 2.75 ms ($T_{100-10}$) These values are illustrative. $T_{0-90}$ and $T_{100-10}$ may be as low as 8 ms or lower and 1 ms or lower, respectively.

Figure 6:
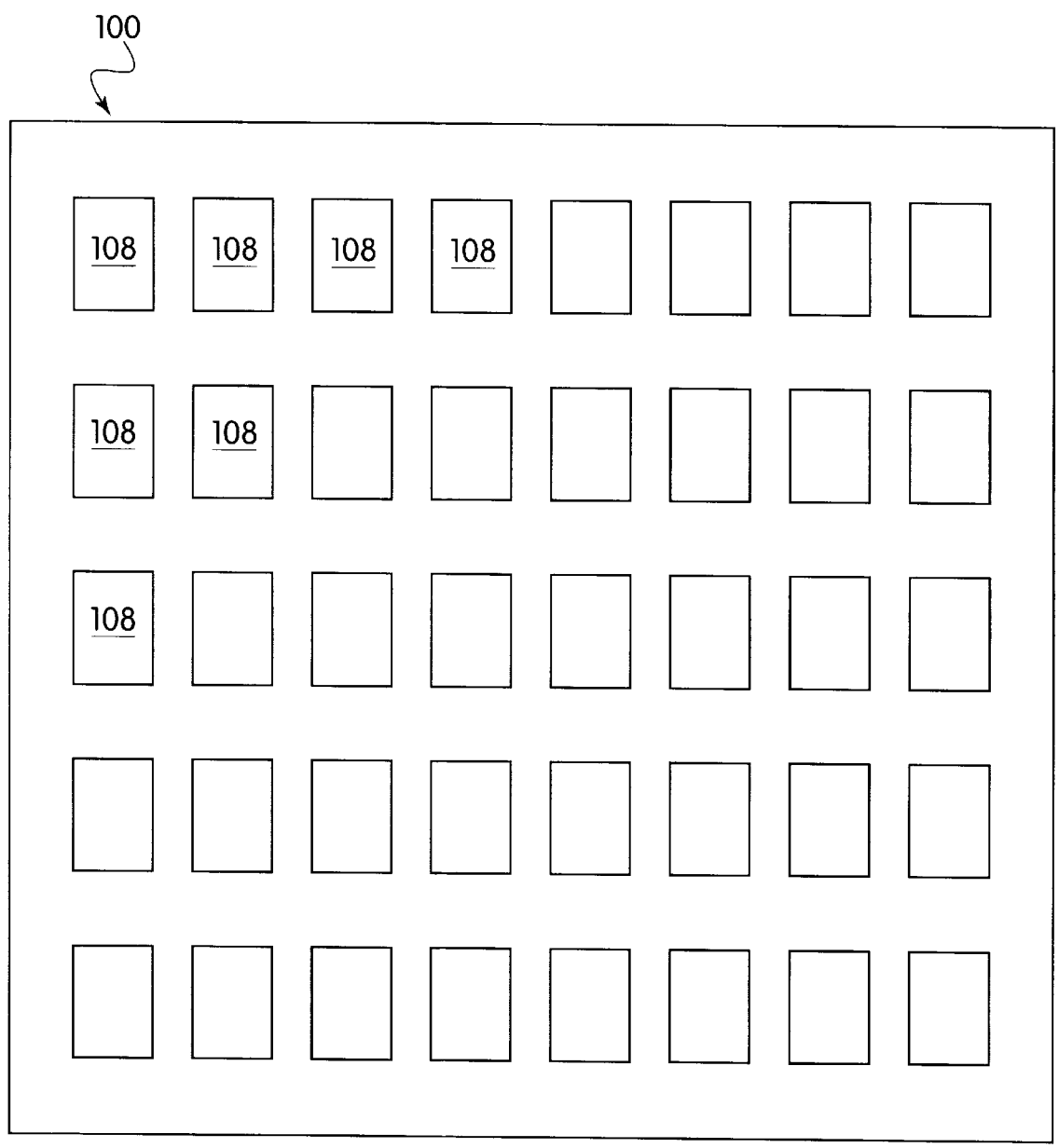
FIG. 6 is a top view of a liquid crystal display in accordance with the present invention.

Referring now to FIG. 6, a liquid crystal display 100 is shown in accordance with the present invention. Liquid crystal display 100 includes a plurality of pixels 108 distributed in a pixel array. Liquid crystal display 100 may be employed for computer displays, personal digital assistant displays, beeper displays, watch displays, or any other type of display which may employ liquid crystal materials.

Having described preferred embodiments of vertically aligned pi-cell liquid crystal display (which are intended to be illustrative and not limiting), it is noted that modifications And variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A liquid crystal display comprising:
   a pair of transparent substrates having surfaces facing each other, coated with a conductive material, the conductive material forming pixel electrodes for an array of pixels;
   a pair of homeotropic alignment layers provided on the conductive material, the alignment layers facing each other and having a same rubbing direction;
   a liquid crystal material disposed between the alignment layers, the liquid crystal material including molecules;
   means for providing an electric field to provide an on state and an off state for the pixel electrodes, the off state being characterized by a vertical alignment of the molecules of the liquid crystal material which is substantially perpendicular to the alignment layers; and
   the on state being characterized by the orientation of the molecules of the liquid crystal material which are oriented responsive to the electric field such that the molecules above a mid-plane of the liquid crystal material have a tilt in a first direction and the molecules below the mid-plane have a tilt opposite the first direction while the molecules adjacent the alignment layers and at the mid-plane remain substantially perpendicular to the alignment layers, the mid-plane being substantially parallel to the alignment layers.

2. The display as recited in claim 1, wherein the electrodes are transparent.

3. The display as recited in claim 2, wherein the electrodes include indium tin oxide.

4. The display as recited in claim 1, wherein one of the electrodes includes a reflective electrode.

5. The display as recited in claim 1, wherein the liquid crystal material includes a negative dielectric anisotropic material.

6. The display as recited in claim 5, wherein the liquid crystal material includes a fluorinated material.

7. The display as recited in claim 1, wherein the liquid crystal material includes a layer having a thickness of between about 2 to about 10 microns.

8. The pixel as recited in claim 1, further comprises polarizers and optical compensation films for providing a viewing angle.

9. A liquid crystal pixel comprising:

a pair of spaced apart electrodes each having a homeotropic alignment layer provided thereon, the alignment layers facing each other and having a same rubbing direction;

a liquid crystal material disposed between the alignment layers, the liquid crystal material including molecules;

the electrodes providing an electric field to provide an on state and an off state for the pixel, the off state being characterized by a vertical alignment which is substantially perpendicular to the alignment layers; and the on state being characterized by the orientation of the molecules of the liquid crystal material which are oriented responsive to the electric field such that the molecules above a mid-plane of the liquid crystal material have a tilt in a first direction and the molecules below the mid-plane have a tilt opposite the first direction while the molecules adjacent the alignment layers and at the mid-plane remain substantially perpendicular to the alignment layers, the mid-plane being substantially parallel to the alignment layers.

10. The pixel as recited in claim 1, wherein the electrodes are transparent.

11. The pixel as recited in claim 10, wherein the electrodes include indium tin oxide.

12. The pixel as recited in claim 1, wherein one of the electrodes includes a reflective electrode.

13. The pixel as recited in claim 1, wherein the liquid crystal material includes a negative dielectric anisotropic material.

14. The pixel as recited in claim 13, wherein the liquid crystal material includes a fluorinated material.

15. The pixel as recited in claim 1, wherein the liquid crystal material includes a layer having a thickness of between about 2 to about 10 microns.

16. The pixel as recited in claim 1, further comprises polarizers and optical compensation films for providing a viewing angle.

17. A liquid crystal mode comprising:

a layer of a liquid crystal material disposed between homeotropic alignment layers having a parallel alignment direction, the liquid crystal material including a negative dielectric anisotropic material; and the liquid crystal material having a first state characterized by a vertical alignment of molecules of the liquid crystal material which is substantially perpendicular to the alignment layers and a second state which is characterized by the orientation of the molecules of the liquid crystal material which are oriented responsive to an electric field such that the molecules above a mid-plane of the liquid crystal material have a tilt in a first direction and the molecules below the mid-plane have a tilt opposite the first direction while the molecules adjacent the alignment layers and at the mid-plane remain substantially perpendicular to the alignment layers, the mid-plane being substantially parallel to the alignment layers.

18. The mode as recited in claim 17, wherein the liquid crystal material includes a fluorinated material.

19. The mode as recited in claim 17, wherein the liquid crystal material includes a layer having a thickness of between about 2 to about 10 microns.

20. A liquid crystal mode comprising:

a layer of a liquid crystal material disposed between homeotropic alignment layers having a parallel alignment direction, the liquid crystal material including a negative dielectric anisotropic material; and the liquid crystal material having a first state characterized by a vertical alignment of molecules of the liquid crystal material which is substantially perpendicular to the alignment layers and a second state which is characterized by the orientation of the molecules of the liquid crystal material which are oriented responsive to an electric field such that the molecules on either side of a mid-plane between the alignment layers rotate in a complementary way, including a lateral flow at the mid-plane in a first direction and a compensating flow between the mid-plane and each alignment layer in a second direction opposite the first direction, the mid-plane being substantially parallel to the alignment layers.

21. The mode as recited in claim 20, wherein the liquid crystal material includes a fluorinated material.

22. The mode as recited in claim 20, wherein the liquid crystal material includes a layer having a thickness of between about 2 to about 10 microns.

23. The mode as recited in claim 20, wherein the molecules above the mid-plane have a tilt in a first direction and the molecules below the mid-plane have a tilt opposite the first direction while the molecules adjacent the alignment layers and at the mid-plane remain substantially perpendicular to the alignment layers.

* * * * *